United States Patent [19]

Sloyan

[11] 4,344,598

[45] Aug. 17, 1982

[54] MOTOR SUPPORT

[75] Inventor: Jerome J. Sloyan, Trenton, N.J.

[73] Assignees: Joseph File; Seth A. Hubbard, both of Riverhead, N.Y.

[21] Appl. No.: 948,747

[22] Filed: Oct. 5, 1978

[51] Int. Cl.$^3$ .............................................. F16M 1/00
[52] U.S. Cl. .................................. 248/651; 248/657; 474/115
[58] Field of Search ............... 248/651, 656, 655, 657, 248/573; 474/115, 114; 254/93 R

[56] References Cited

U.S. PATENT DOCUMENTS

| 454,467 | 6/1891 | Foote | 248/651 |
|---|---|---|---|
| 1,877,021 | 9/1932 | Northrop et al. | 248/573 |
| 1,878,983 | 9/1932 | Harris | 474/115 |
| 2,373,125 | 4/1945 | Loepsinger | 248/573 |
| 2,699,586 | 1/1955 | Dorsey et al. | 254/93 R X |
| 2,762,662 | 9/1956 | Sloyan | 474/115 |
| 2,833,594 | 5/1958 | Sloyan | 248/657 X |
| 2,874,006 | 2/1959 | Sloyan | 474/115 |

Primary Examiner—J. Franklin Foss
Attorney, Agent, or Firm—Mawhinney, Mawhinney & Connors

[57] ABSTRACT

In a motor support having a slidable carriage on which a motor with a pulley, carrying a belt connected to a pulley on a piece of machinery, is mounted, springs engage the carriage to provide a spring loading for the carriage and a fluid pressure arrangement is provided for moving the carriage initially to tighten the belt and then to compress the springs to the point that the force exerted by the springs on the carriage will be in equilibrium with the tension in the belt between the pulleys with such state of equilibrium being maintained solely by further compression of the springs under belt induced movement of the carriage as the load on the machinery may be increased.

2 Claims, 4 Drawing Figures

MOTOR SUPPORT

BACKGROUND OF THE INVENTION

1. Field of the Invention

The present invention generally appertains to improvements in machinery supports and, more particularly, is directed to a new and novel type of support for motors whereby the motor is supported in a manner to have a refined adjustable relation to some other instrumentality, as, for example, a driven piece of machinery.

2. Background of the Invention

The present invention relates to improvements in motor supports of the type shown in my prior U.S. Pat. No. 2,646,951 issued on July 28, 1953. In such patent, a slidable carriage is mounted for sliding movement on cylindrical rods that extend in parallelism between fixed supports. The carriage is adapted to support a motor which drives a piece of machinery through the means of a belt connected between pulleys mounted on the shafts of the motor and the machinery. In such assembly, it is essential that the tension of the belt be initially adjusted with the tension being maintained, thereafter, by spring loading acting on the carriage. It is customary, as disclosed in such patent, for an adjusting screw and follower nut to be employed for the purpose of compressing the springs which in turn provide the required amount of tension in the belt.

However, where such a motor support is operatively disposed in an environment where dust, dirt, sand or other similar granular materials are prelevant or where viscous fluids are present, the threads of the adjusting screw tend to become fouled up and, therefore, the function of the screw is impaired to the extent that it cannot be reliably utilized to move the nut so as to vary the amount of compression placed on the spring loading arrangement for the carriage.

BRIEF DESCRIPTION OF THE INVENTION

In accordance with the present invention, the conventional adjusting screw and follower nut utilized as a means to compress the springs are replaced by a fluid pressure arrangement. Essentially, such arrangement comprises a cylinder and pump, with the pump hydraulically operating a piston in the cylinder. The cylinder is mounted on the rear support in a position parallel to the rods so as to be perpendicular to the carriage that slides on the rods between the front and back fixed support means. The piston rod of the pump is connected to the movable spring seat of a spring cage assembly that has a fixed spring seat attached to the carriage with compression springs being guidingly located between the seats.

When the pump is first operated, the piston will be forced outwardly and will result in the movement of the motor carriage from a retracted position adjacent the rear support toward the front fixed support with the only resistance offered to the movement of the carriage being the slight friction of the carriage on the rods. But since this is relatively small, little force need by exerted by the piston on the spring cage assembly which is comprised of the movable spring seat and the fixed spring seat, the latter being fixed to the carriage.

When the piston acts on the movable spring seat it will slightly compress the springs which are disposed between the two spring seats. Thus, as the piston moves the carriage in a direction away from the driven pulley of the adjacent machinery, the slack in the belt between the drive pulley on the motor and the driven pulley on the machinery will be taken up. As the carriage continues to be moved, the belt will become tight and resist further movement of the carriage. At this point, the resistance offered by the belt will be sufficient to prevent further movement of the carriage and continued operation of the pump will develop sufficient pressure on the piston to cause the movable spring seat to move and compress the springs. The force then exerted by the springs will be equal to the tension in the belt so that, in other words, the force exerted by the springs will be in equilibrium with the tension in the belt.

The proper amount of tension that should be applied to the belt is the minimum necessary to transmit the required amount of power from the drive pulley on the motor to the driven pulley on the machinery without slippage under normal load. Assuming that during normal operations the load on the machinery is increased, it must be borne in mind that the carriage is easily slidable on the rods between the supports. As a result, the carriage will be drawn toward the driven pulley by the increased load on the belt. As such action occurs, the piston cannot be moved inwardly of the cylinder because of the fluid pressure within the cylinder. Since the piston cannot be moved, the movable spring seat cannot be moved. As a result, the movement of the carriage toward the driven pulley will cause the fixed spring seat to move toward the movable spring seat and increase the amount the springs are compressed. And such amount of compression will be equal to the increase in the amount of tension being applied to the belt so that again a state of equilibrium will exist between the force exerted by the springs and the amount of tension in the belt.

DESCRIPTION OF THE PREFERRED EMBODIMENT

Figure 1:
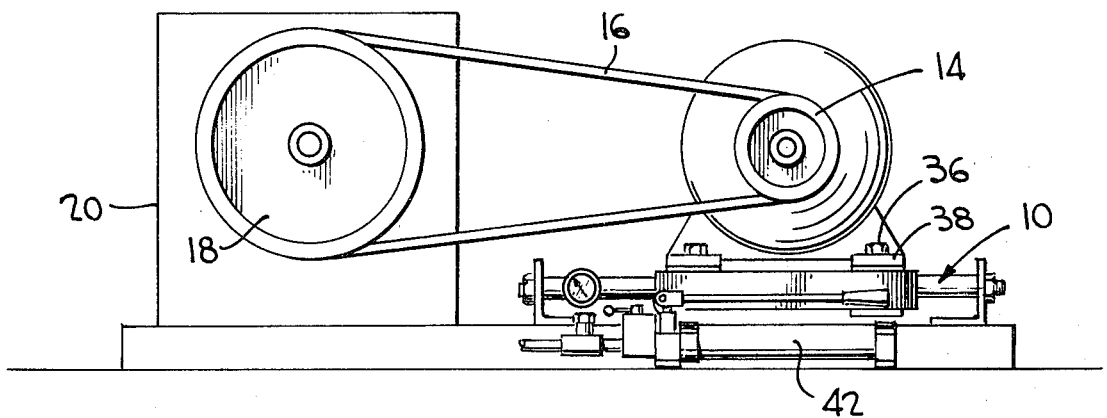
FIG. 1 is a side elevation of the motor support of this invention and showing the same in use in association with a driven piece of machinery with a belt between the motor drive pulley and the machinery driven pulley.

Referring now more particularly to the accompanying drawings, and initially to FIG. 1 for preliminary clarification to orient the present invention in relation to its use, it will be noted that the motor support 10 is provided to support a motor 12 having a drive pulley 14. The drive pulley 14 is connected by a belt 16 with the pulley 18 of adjoining piece of machinery or other instrumentality 20 that is to be driven by the motor.

Figure 2:
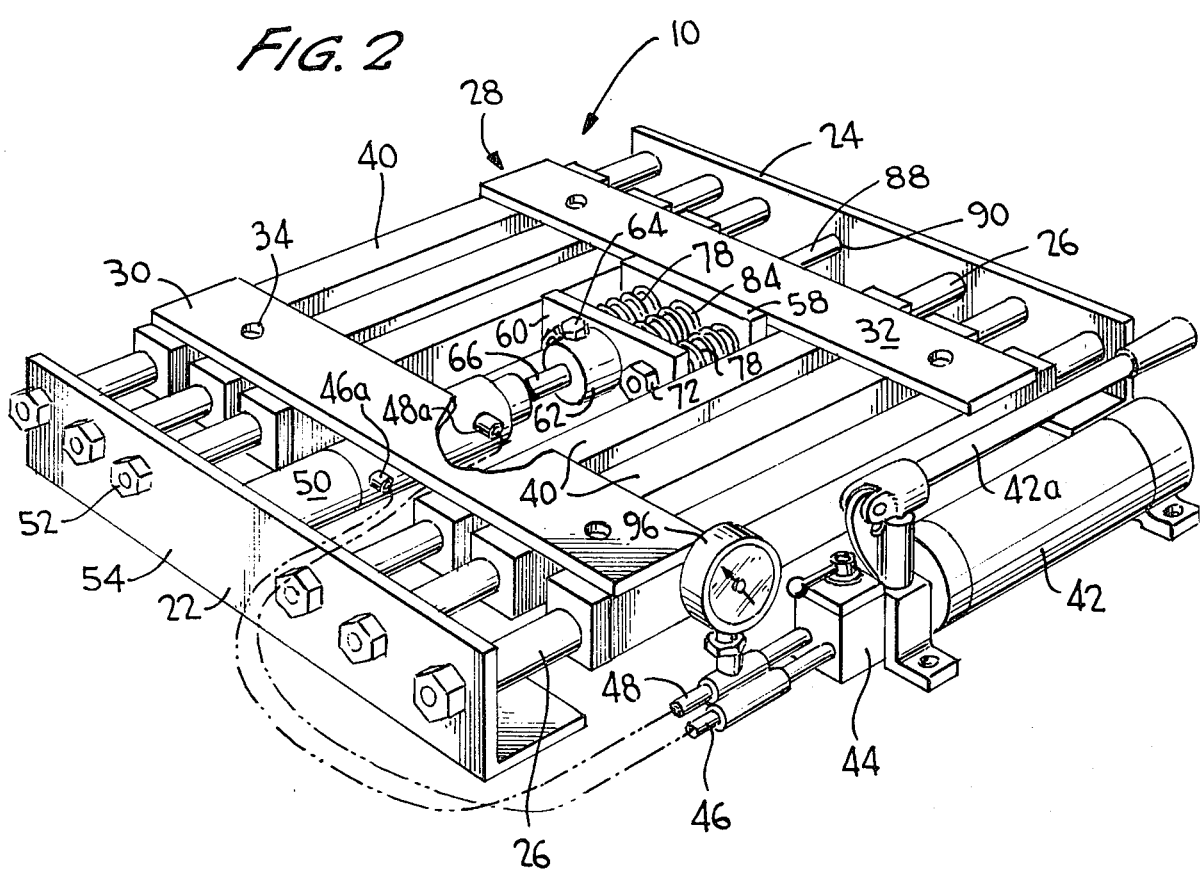
FIG. 2 is a view in perspective of the motor support of the present invention.
Figure 3:
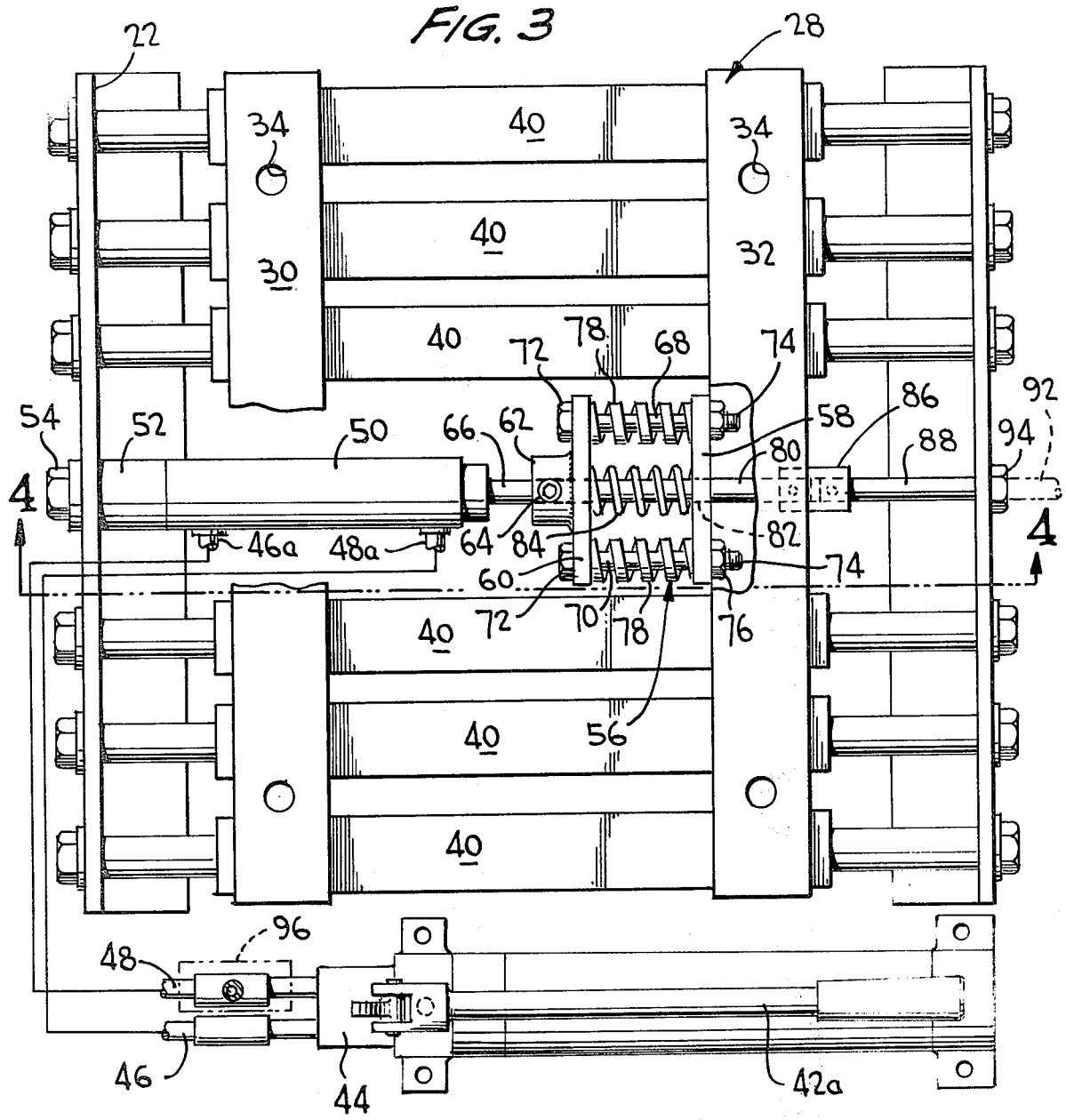
FIG. 3 is a top plan view thereof.
Figure 4:
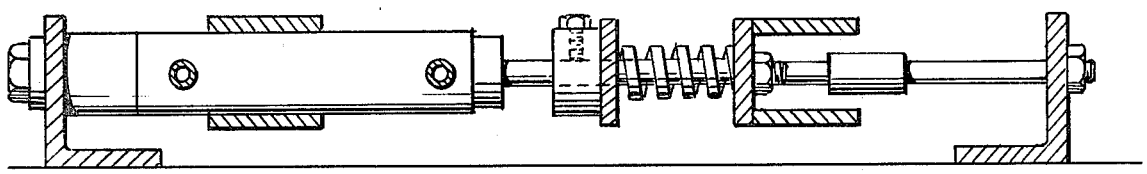
FIG. 4 is a longitudinal, vertical sectional view taken substantially on line 4—4 of FIG. 3.

Referring now more particularly to FIGS. 2 and 3, the motor support 10 includes a pair of parallel fixed supports 22 and 24, the former being the rear fixed support and the latter being considered the front fixed support, having regard to the pulley front end of the motor 12. The fixed supports provide supports for cylindrical rods 26, the number of which can vary, and which extend in parallelism between the vertical flanges of the fixed supports to which they are fixed by suitable openings and fastening nuts, as disclosed in U.S. Pat. No. 2,833,597.

A carriage 28, which constitutes the movable portion of the motor support 10, is composed of plates 30 and 32 which, as shown, are two in number but which could be a single plate. The plates, which, in essence, constitute the movable top plate of the carriage have vertical openings 34 to receive bolt fasteners 36 whereby the feet 38 of the motor 12 are mounted thereon as shown in FIG. 1. The plates are fixedly supported by glider sleeves 40 which freely slide on the rods 26 and which are provided with suitable bearing assemblies and desirable lubricant arrangements in order that the entire carriage 28 can freely slide with a minimum of friction on the rods 26 between the rear and front supports. This is more particularly disclosed in my prior U.S. Pat. No. 2,833,597.

A hand operated hydraulic pump 42 is provided and is connected by a four way directional valve 44 through hydraulic lines 46 and 48 to opposite ends of a cylinder 50. The closed end portion 52 of the cylinder is mounted by suitable fastening means 54 on the vertical flange of the rear fixed support and extends forwardly toward the front support and lies parallel with the rods 26. Preferably, the pump is centrally disposed between the plurality of rods for maximum value in operation.

A spring cage assembly 56 is provided and comprises a fixed spring seat 58 which is secured, as by welding, to the front plate 32 of the carriage 28 or, in the instance of a single top plate, may be otherwise fixed securely thereto. A movable spring seat 60 is formed with a collar 62 that is affixed securely, as by a bolt 64, to the protruding end portion 66 of the piston rod which has its piston acted upon the fluid pressure within the cylinder 50. Outer spring guides 68 and 70, in the form of elongated bolts, are connected between the fixed and movable spring seats. Preferably, the heads 72 of the bolts are disposed outwardly of the movable spring seat while the threaded end portions 74 are attached fixedly to the fixed spring seat and locked in threaded openings in such fixed spring seat by nuts 76. The shanks of the spring guides, between the fixed spring seat 58 and the movable spring seat 60, support compression springs 78 which are coiled thereon and which bear at their outer ends against the inner faces of the spring seats. A center guide rod 80 had its one end threaded into the movable spring seat 60 with its opposing end portion sliding freely through an enlarged opening 82 in the fixed spring seat 58. A compression spring 84 is coiled on the guide rod 80 and bears against the movable spring seat 60 and the fixed spring seat 58. A fail safe arrangement, in the form of a rod 88, is provided. The rod 88 is fixed by a coupling 86 to the outer end of the rod 80. The rod 88 extends slidably through a suitable opening 90 in the vertical flange of the front fixed support and functions in a manner to be described.

In operation, it can be assumed that the freely sliding motor carriage 28, composed of the top plates 30 and 32 and the supporting sliding gliders 40, is in a retracted position, as shown in the FIG. 3, with the motor, of course, being mounted thereon. The motor is not shown in FIG. 3 for clarification purposes. With the motor carriage in such retracted position, the belt 16 can be installed with ease on the pulleys 14 and 18.

Then the four-way valve 44 is set so that the fluid from the pump 42 passes through the hydraulic line 46 to the port 46a in the cylinder 50, as the hand lever 42a is actuated. When the hand lever 42a is actuated so as to operate the piston, in the manner described, the piston rod 66 will be forced outwardly so as to cause a movement of the motor carriage 28 away from its retracted position. The only resistance offered to the movement of the carriage at this time would be the friction of the gliders 40 on the rods 26. However, such friction is relatively small and, therefore, little force need be exerted by the piston rod acting on the movable spring seat 60 to only slightly compress the springs. As the carriage is being moved in a direction away from the driven pulley 18, the slack in the belt 16 will be taken up. As the carriage continues to move, the belt will begin to get tight and resist further movement of the carriage. At this point, the resistance offered by the belt will be enough to prevent further movement of the carriage 28 and continued operation of the pump 42 will develop sufficient pressure on the piston of the piston rod to cause the movable seat 60 to move toward the fixed seat and compress the springs. The force then exerted by the springs will be equal to the tension in the belt 16. In other words, the force exerted by the springs will be in equilibrium with the tension in the belt. The outer spring guides 68 and 70 of course, are threadedly attached to the fixed spring seat 58 but the holes in the movable spring seat 60 are enlarged relative to the shanks of the guides so as to permit the movable spring seat 60 to slide easily over the guides. The inner spring guide 80 is threaded into the movable spring seat but where it passes through the fixed spring seat 58 it moves through the enlarged hole 82. Obviously, the inner spring guide being threaded to the movable spring seat 60 moves with it. The proper amount of tension which should be applied to the belt is the minimum necessary to transmit the required amount of power to the driven pulley 18 without slippage under normal load.

Assuming that, during normal operations, the load on the driven machinery 20 is increased, and bearing in mind that the carriage is readily slidable, it can be appreciated that the carriage 28 will be drawn towards the driven pulley 18 by the increase in the load on the belt. It must also be understood that the piston rod cannot be moved inwardly into the cylinder 50 because of the presence of fluid in the rear end portion of the cylinder with the fluid being unable to be removed from the cylinder as the valve 44 is closed. As a result, the movement of the carriage toward the driven pulley will increase the amount the springs are compressed. And such amount of that compression will be equal to the increase in the amount of tension being applied to the belt. Again, a state of equilibrium will exist between the force exerted by the springs and the amount of tension in the belt.

In the event that a leak might develop in the hydraulic system so as to permit the piston and the piston rod to recede back into the cylinder which would result in the force exerted by the springs being reduced, a fail safe restraint arrangement is provided, as shown particularly in FIG. 3. In this respect, the extension rod 88 which is secured by the coupling 86 to the extending portion of the center spring guide, is threaded at its outer end portion 92 to receive a nut 94 which bears against the outer face of the vertical flange of the front support 24. The nut 94 need be made only hand tight against the support 24 and provides a supplementary restraint which would act as a stop for the piston rod to prevent its retraction into the cylinder in the event that a leak develops in the hydraulic system.

A pressure gauge 96 is provided to indicate relatively the amount of tension being applied to the belt.

It can be appreciated that the fluid pressure adjustment arrangement will completely overcome the drawbacks in the conventional adjusting screw assembly since the same will function constantly and satisfactorily in any type of environment regardless of the nature thereof. The fluid pressure system is not susceptible of malfunctioning as would be the case where the threads of the adjusting screw would become fouled in the event that dirt or vicous fluid should adhere to the threads and thereby impair the function of the screw.

In order to remove the belt 16, the operation is reversed. In other words, the four way valve 44 is turned so that the operation of the pump forces the fluid through the line 48 into the front end of the cylinder 50 through the front end port 48a while causing the fluid to exhaust through the port 46a. This will cause the piston rod to be moved back into the cylinder and pull the carriage back into its retracted position resulting in a slack in the belt 16.

While the preferred embodiment of the present invention has been shown and described herein, it is understood that such is merely of an exemplary nature and that the invention is only limited by the appended claims. In this regard, the number of springs and their guides may vary and, for example, the spring on the center guide can be eliminated. Likewise, other structural changes can be made without departing from the claimed invention.

What is claimed is:

1. A support for a motor having a drive pulley adapted to be connected by a belt to the driven pulley of a piece of machinery or the like comprising a base, a carriage slidable on the base and having an upper surface on which a motor is fixedly mounted, a fixed spring seat carried by the carriage, a hydraulic cylinder mounted on the base and having a piston rod workingly extending therefrom with the cylinder and the piston rod having their longitudinal axes aligned with the direction of sliding movement of the carriage, a movable spring seat carried by the piston rod, a spring assembly mounted between the seats with the movable seat being movable relative to the fixed seat in comprising the spring assembly, said spring assembly including guide rods fixed to the fixed seat and extending between the seats with the movable seat being slidable thereon and compression springs coiled on the guide rods and bearing against both seats, said piston rod having an outer end extension rod which extends lengthwise beyond the fixed seat and slidably passes through an end of the base, and an adjustably mounted stop on the extension rod disposed on the outer face of said base end with said stop engaging the base end to prevent retraction of the piston rod into the cylinder in the event fluid pressure should leak from the cylinder whereby release of compressive force on the spring assembly between the seats would be prevented should fluid pressure leak from the cylinder.

2. The invention of claim 1 wherein a pump is provided and is connected to the cylinder by a four way valve, said valve being movable into one position to enable pressure fluid to be forced into one end of the cylinder so as to move the piston rod outwardly in the cylinder and move the carriage to its position to tighten the belt and the valve being movable into another position to enable the pressure fluid to be forced by the pump into the opposite end of the cylinder so as to move the piston rod inwardly in the cylinder and move the carriage to a retracted position to slacken the belt.

* * * * *